(12) United States Patent
Fly

(10) Patent No.: US 10,427,379 B2
(45) Date of Patent: Oct. 1, 2019

(54) PRINTED SCAFFOLD STRUCTURE FOR HYBRID COMPOSITES

(71) Applicant: David E. Fly, Wheeler, WI (US)

(72) Inventor: David E. Fly, Wheeler, WI (US)

(*) Notice: Subject to any disclaimer, the term of this patent is extended or adjusted under 35 U.S.C. 154(b) by 309 days.

(21) Appl. No.: 15/239,550

(22) Filed: Aug. 17, 2016

(65) Prior Publication Data

US 2017/0050384 A1 Feb. 23, 2017

Related U.S. Application Data

(60) Provisional application No. 62/206,609, filed on Aug. 18, 2015.

(51) Int. Cl.
*B33Y 10/00* (2015.01)
*B33Y 80/00* (2015.01)
*B32B 5/26* (2006.01)
*B29C 64/40* (2017.01)
*B29K 307/04* (2006.01)

(52) U.S. Cl.
CPC ............... *B32B 5/26* (2013.01); *B29C 64/40* (2017.08); *B29K 2307/04* (2013.01); *B33Y 10/00* (2014.12); *B33Y 80/00* (2014.12)

(58) Field of Classification Search
CPC ......... B33Y 80/00; B33Y 10/00; B33Y 70/00; B33Y 50/02; B33Y 30/00; B29C 64/20; B29C 64/393; B29C 64/171; B29C 64/386
USPC .................................................... 700/98, 119
See application file for complete search history.

(56) References Cited

U.S. PATENT DOCUMENTS

2016/0347119 A1* 12/2016 Quiroz ..................... B60B 5/02

* cited by examiner

*Primary Examiner* — Catherine A. Simone
(74) *Attorney, Agent, or Firm* — Derek L. Prestin; Ruder Ware, L.L.S.C.

(57) ABSTRACT

The present invention provides a 3-D printed scaffold tailored to a particular hybrid composite material to receive the reinforcement components and support them during application of a secondary composite material. The printed scaffold may provide for retention features that locate and hold the reinforcement components in a variety of different configurations and may incorporate a microstructure having vacuum diffusion properties to assist in composite material lay-up. The invention contemplates either that the scaffold may be sacrificial (retained in hybrid composite) or constructed to permit disassembly and reuse. The 3D printed scaffold may also provide shapes or profile surfaces serving as layup forms that give shape to the woven fiber mat during assembly.

10 Claims, 8 Drawing Sheets

US 10,427,379 B2

PRINTED SCAFFOLD STRUCTURE FOR HYBRID COMPOSITES

CROSS REFERENCE TO RELATED APPLICATION

This application claims the benefit of U.S. Provisional Application No. 62/206,609, filed Aug. 18, 2015.

BACKGROUND OF THE INVENTION

The present invention rotates to hybrid composite materials and in particular to a hybrid composite and a manufacturing process using a 3-D printed element in the fabrication of the hybrid composites.

Hybrid composites are materials constructed from two different materials, one of which is a composite (for example, a fiber reinforced polymer with a metal, or two different fiber reinforced polymer matrices). The use of hybrid composites simplifies the design and manufacture of specialized materials by allowing pre-manufacture of one composite element having particular strength properties and then permitting the composite element to be assembled into a secondary composite to augment the strength of that secondary composite in a way that would be difficult to manufacture monolithically. For example, a reinforced shape, such as a rod or bar may be advantageously pre-manufactured by extrusion or pultrusion to provide axial alignment of the fiber reinforcements. The pultruded shape may then be incorporated into a secondary composite laid up with woven fiber mats. Each manufacturing process contributes its particular advantage.

During the manufacturing process of a hybrid composite, the pre-manufactured reinforcement components must be properly aligned and retained for integration into the completed structure. Supporting the components of a hybrid composite material during integration can be difficult.

SUMMARY OF THE INVENTION

The present invention provides a 3-D printed scaffold tailored to the particular hybrid to receive the reinforcement components and support them during application of a secondary composite material. The printed scaffold may provide for retention features that locate and hold the reinforcement components in a variety of different configurations and may incorporate a microstructure having vacuum diffusion properties to assist in composite material lay-up. The invention contemplates either that the scaffold may be sacrificial (retained in hybrid composite) or constructed to permit disassembly and reuse. The 3D printed scaffold may also provide shapes or profile surfaces serving as layup forms that give shape to the woven fiber mat during assembly.

These particular objects and advantages may apply to only n e embodiments falling within the claims and thus do not define the scope of the invention.

BRIEF DESCRIPTION OF THE DRAWINGS

FIG. 4 is a cross-sectional view through a printed scaffold similar to that of FIG. 1 as attached to reinforcement components prior to incorporation into a secondary composite material, Where the printed scaffold is assembled from multiple printed elements using a water-soluble glue or the like;

DETAILED DESCRIPTION OF THE PREFERRED EMBODIMENT

Figure 1:
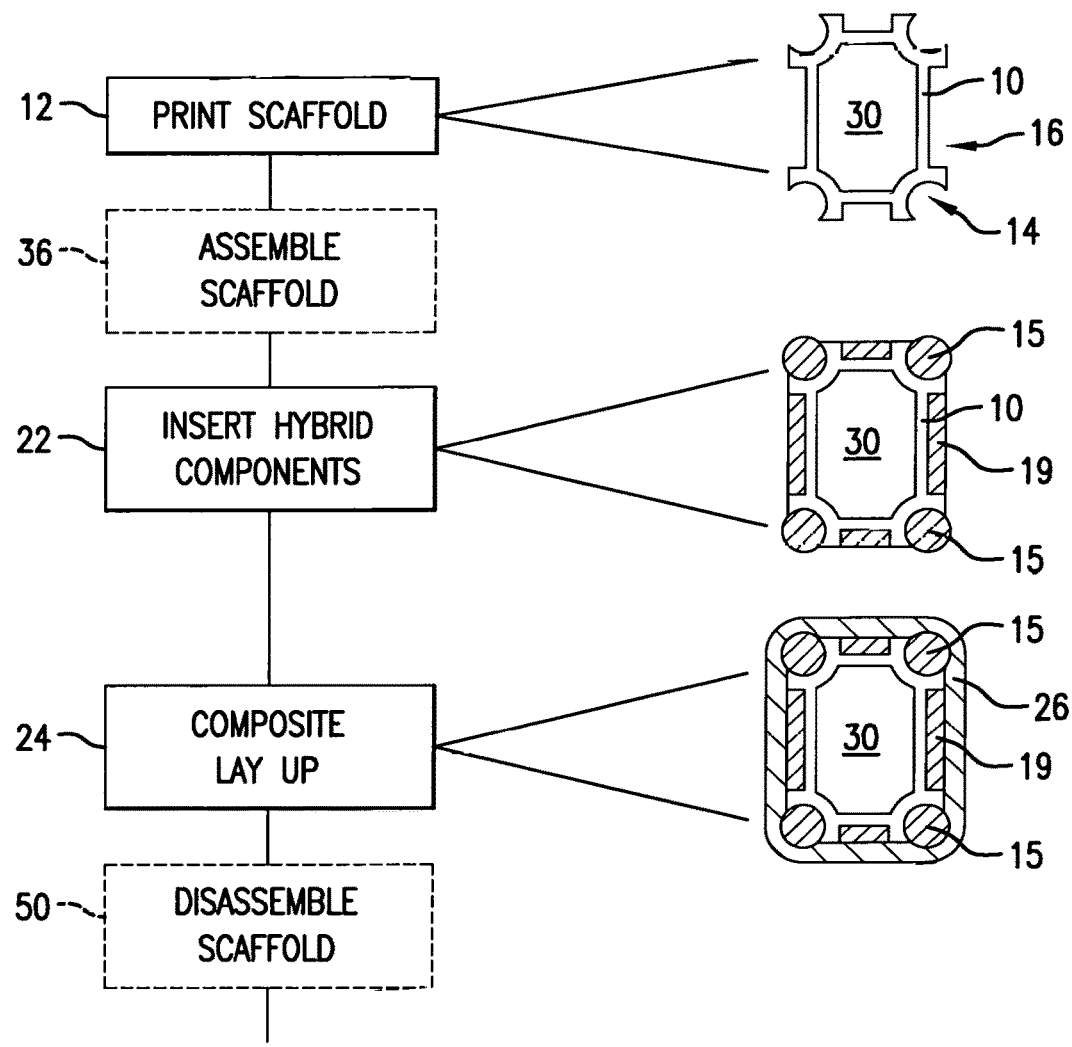
FIG. 1 is a flowchart of the manufacturing process of the present invention together with a cross-sectional view of an example 3-D scaffold for a hollow rectangular tube as it is used. to construct a hybrid composite element.

Referring now to FIG. 1, the present invention provides a manufacturing method in which a 3-D printed scaffold 10 is prepared, as indicated by process block 12, that will serve as a mold and retaining fixture in the construction of a hybrid composite material. The scaffold 10 may be printed by a variety of different 3-D printing technologies including, for example, those using extrusion processes such as the extrusion of a molten plastic filament (fused deposition modeling) and those using photo polymerization (stereolithography) or sintering (e.g., selective laser sintering) or the like. Importantly the material of the scaffold 10 may have relatively modest physical properties far beneath those required of the final hybrid composite product allowing a wide variety of materials to be used including, for example, low temperature or brittle polymers. The material of scaffold 10 may also have relatively stronger physical properties far above those of the hybrid composite polymers.

Figure 2:
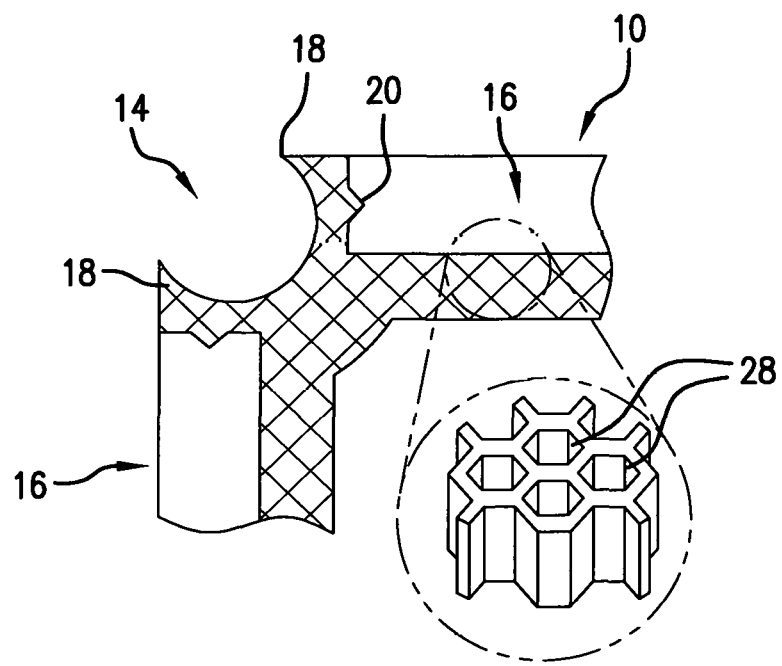
FIG. 2 is a fragmentary detail of the scaffold of FIG. 1 showing in an enlarged further detail a microscopic pore structure for vacuum diffusion.

Referring now also to FIG. 2, the scaffold 10 may include pockets 14 and 16 for receiving and retaining reinforcement materials with a predetermined spatial location. For example, in the construction of an elongated rectangular hybrid composite tube, the scaffold 10 may have a generally rectangular cross-section. At each corner of the scaffold 10, the scaffold 10 may provide first pocket 14 that may receive reinforcement components 15 in the form of a pultruded fiber-composite rod having a circular cross-section. The reinforcement components 15 may extend along the axial length of the scaffold 10 at each corner to provide enhanced strength to the ultimately produced product.

In this regard, the pockets 14 of the scaffold 10 may include retention features, for example, pocket lips 18, which project so that the pocket 16 extends in close contact over more than 180 degrees around the circumference of the reinforcement components 15. As a result, the pocket lips 18 must flex outwardly to receive the rod-shaped reinforcement components 15 and then to spring inward to retain the reinforcement components 15 within the pocket 14 with a snap-like action possible with resilience of the material of the scaffold 10.

Similarly, pocket 16 may provide a shallow trough sized to receive a reinforcement component 19, the latter in the form of a pultruded fiber-reinforced bar of generally rectangular cross-section. Pocket 16 may also include retention features 20 allowing the reinforcement component 19 to be press fit into the pocket 16 and retained by inward force through the retention feature 20 relying on the elasticity of the retention feature 20 or its support in the scaffold 10.

In this way the scaffold 10 may receive the reinforcement components 15 and 19 per process block 22 and may locate and retain the reinforcement components 15 and 19 in a desired relationship to each other and the other surfaces of the scaffold 10.

As indicated by process block 24, a secondary composite 26 may then be applied around the outside of the scaffold 10 in contact with the reinforcement components 15 and 19 to integrate the latter therewith to form the completed hybrid composite element 31. The secondary composite 26, for example, may be a fiber mat impregnated with a curing polymer material or may be a wound fiber tow within an adhesive matrix or other composite material.

Figure 3:
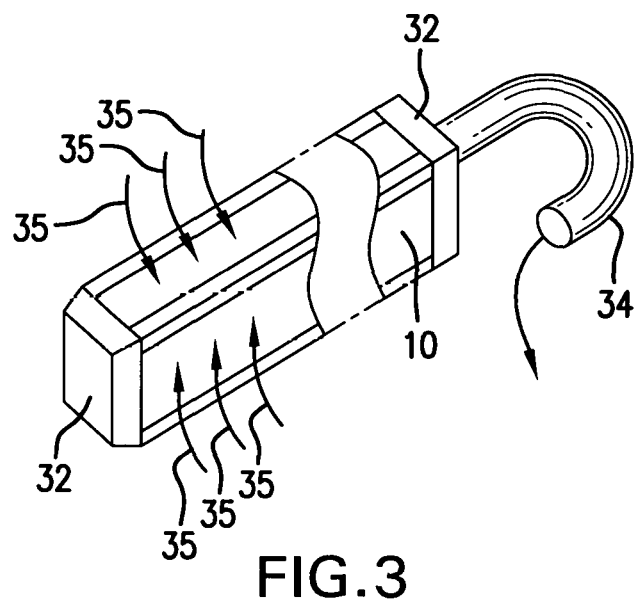
FIG. 3 is a perspective view of the scaffold as attached to the reinforcement components and showing an air path through the walls of the scaffold for assisting in lay-up of the secondary composite material.

Referring now also to FIGS. 2 and 3, the scaffold 10 may incorporate micro-channels 28 leading from a center lumen 30 within the scaffold 10 to outer surfaces of the scaffold 10. The micro-channels 28 may be readily formed during the three-dimensional printing process which admits to such complexity without substantially increasing the cost of the part. Upon completion of the scaffold and the insertion of hybrid components per process block 22, plugs 32 may be installed at either end of the scaffold 10 to cover the central lumen 30. One plug 32 may communicate with a vacuum hose 34 drawing air out of the central lumen 30 so that replenishing air 35 passes diffusely through the walls of the scaffold 10 and around the inserted reinforcement components 15 and 19 to help pull secondary composite 26 into tight contact with the reinforcement components 15 and 19 and to remove any trapped air. In this example, the scaffold 10 may remain within the completed hybrid composite element 31 or may be removed by melting, dissolving, or other destruction of the scaffold 10.

Referring again to FIGS. 1 and 4, in an alternative embodiment, after the scaffold 10 is printed, in an optional step 36, the printed elements of the scaffold may be assembled together into the final scaffold 10 used at process block 22. This assembly may employ, for example, mechanical detent elements like snaps or hooks built into the components of the scaffold 10 or, for example, the application of a releasable adhesive 38 to joints between scaffold elements 40. For example, the releasable adhesive 38 may be a water-soluble glue or the like allowing it to be released by exposing scaffold 10 to water introduced through the lumen 30.

In this case the reinforcement components 15 and 19 may also be attached to the scaffold elements 40 by means of releasable adhesive 38. This will allow the scaffold elements 40 to be more easily removed from the reinforcement components 15 as will be discussed below.

Figure 4:
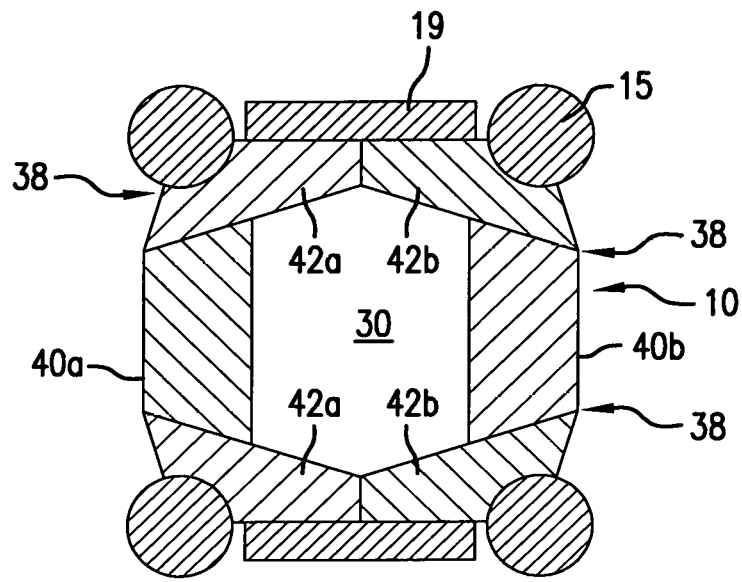

In the example of FIG. 4, the scaffold 10 is constructed of six interconnected elements including left and right sidewalls 40a and 40b which have wedge-shaped quadrilateral cross-sections to present a smaller outer face at the outside of the scaffold 10 and a larger interior face near the lumen 30. This configuration will assist in withdrawing the elements 40a and 40b away from the secondary composite 26 as will be discussed. The left and right sidewalls 40a and 40b are joined to upper and lower scaffold plates 42 each being mirror images of the other and each formed of left scaffold portion 42a and right scaffold portion 42b attached by water-soluble adhesive 38 along a vertical midline of the scaffold 10. The left scaffold portion 42a and right scaffold portion 42b contact the left and right sidewalls 40a and 40b along outwardly sloping interfaces that permit the left and right sidewalls 40a and 40b to separate from the left scaffold portion 42a and right scaffold portion 42b as they move inward which in turn allows the left scaffold portion 42a and right scaffold portion 42b to also be removed from the secondary composite 26.

Figure 5:
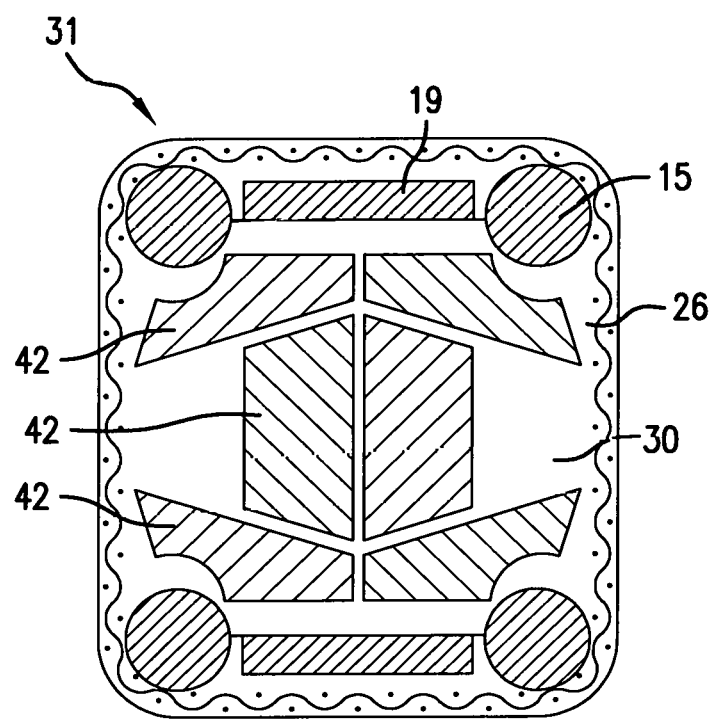
FIG. 5 is a figure similar to that of FIG. 4 showing the reinforcement components incorporated into a secondary composite and the disassembly of the scaffold for removal.

Referring now to FIG. 5, and as indicated by process block 50, after the application, of the secondary composite 26, the scaffold 10 may be disassembled after softening the adhesive 38 through a water bath introduced through the lumen 30. As noted above, this allows the left and right scaffold portions 42a and 42b and left and right sidewalks 40a and 40b to be drawn inward and then be withdrawn from the lumen 30 along an axis of the completed hybrid composite element 31 for reuse.

Figure 6:
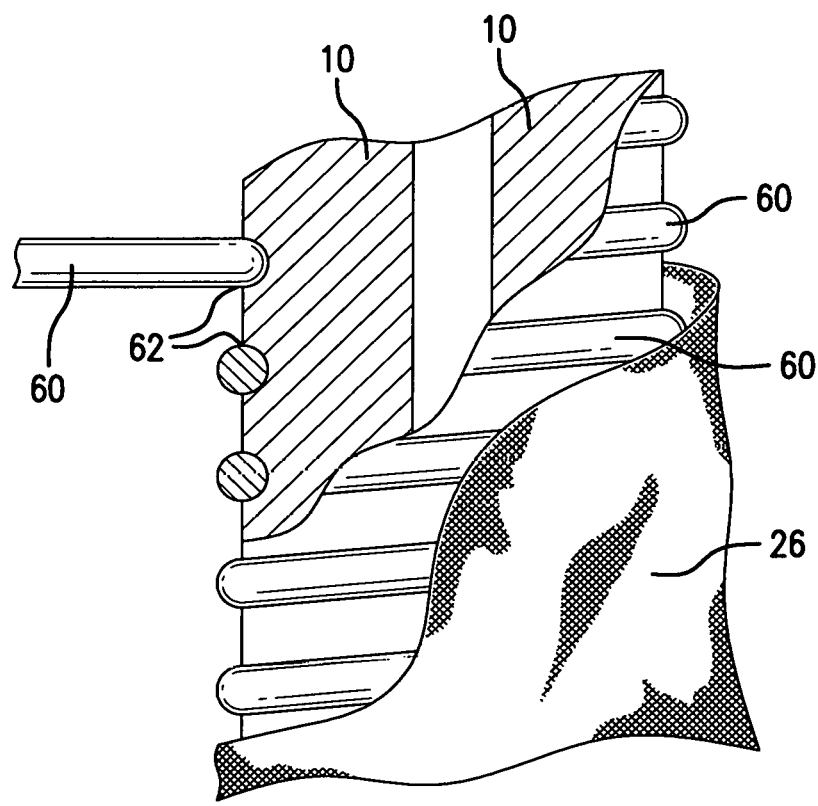
FIG. 6 is a fragmentary view with several layers of cutaway showing a scaffold for a fiber tow support.

Referring now to FIG. 6, the scaffold 10 may work with a flexible hybrid component, for example, a fiber tow 60 which may be wound in locating grooves 62 on the scaffold 10 to provide for controlled strength augmentation to a superficially applied secondary composite 26. In this case, tension on the tow 60 retains it against the scaffold 10 without the need for mechanical retaining elements or the like.

Figure 7:
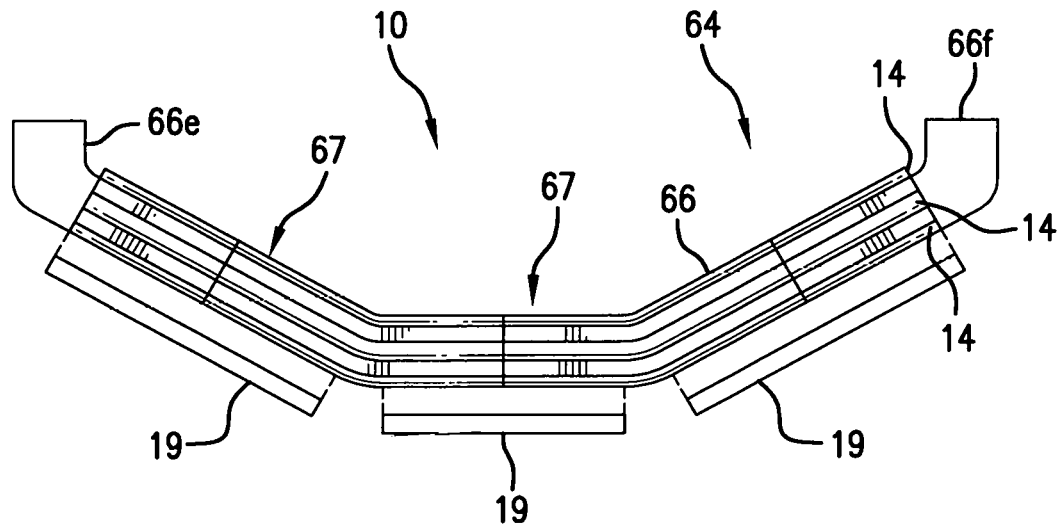
FIG. 7 is a top plan view, partially exploded, of scaffold for the manufacture of a bumper using the principles of the present invention showing reinforcement components prior to assembly on the scaffold.
Figure 8:
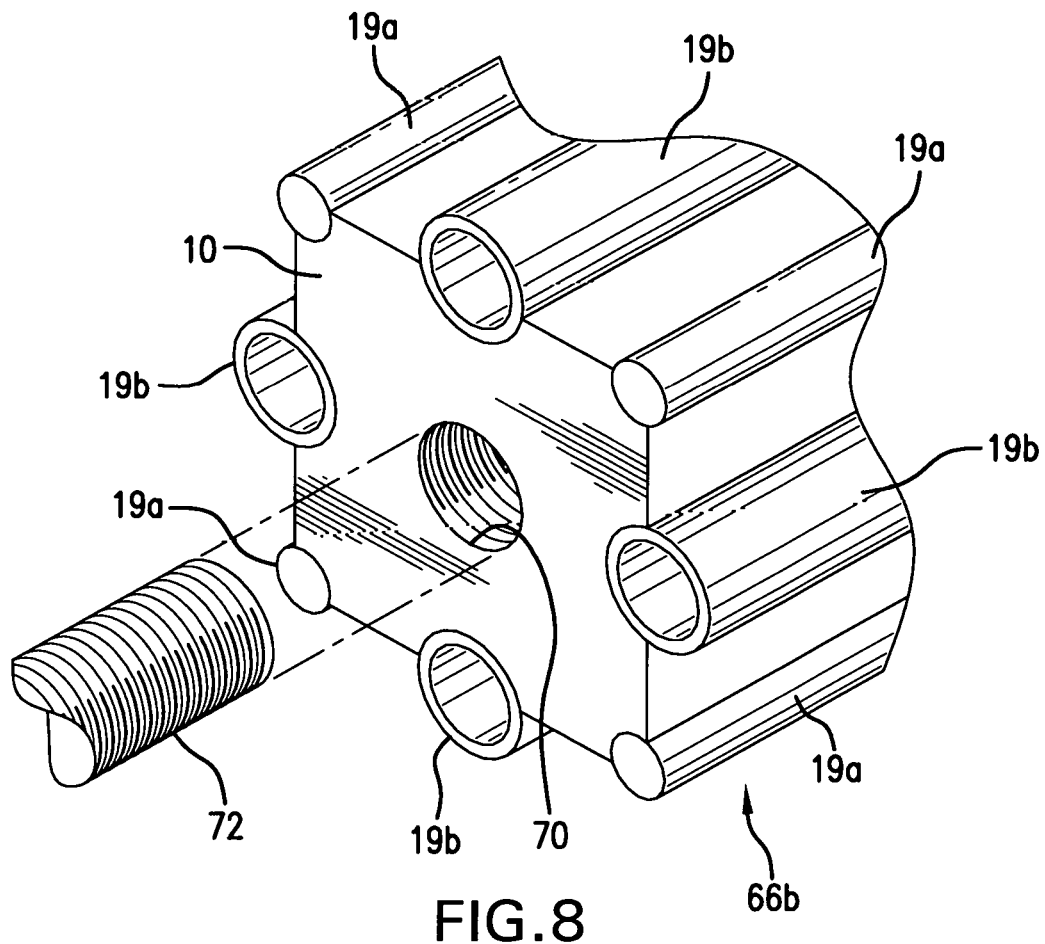
FIG. 8 is a fragmentary perspective view of the scaffold of FIG. 7 with reinforcement components installed and showing the use of an internal threaded rod for assembly of scaffold components together.

Referring now to FIGS. 7 and 8, in an example use of the present invention, a bumper 64 may be assembled from a set of 3D printed scaffold elements 66a-66f that are interconnected to make a scaffold 10. This interconnection may be accomplished by providing for a central bore 70 running axially through a center of each of the scaffold elements 66 that will receive an short length of an oversized threaded rod 72 (serving to cut its own threads within the bore 70) allowing the scaffold elements 66 to be assembled together by relative rotation of the scaffold elements 66 about the threaded rod 72. For this purpose, adhesive may be applied to the threaded rod 72 after receipt by one of the scaffold elements 66 to prevent its further engagement with that scaffold elements 66 upon mutual rotation of the scaffold elements 66 to tighten together along the joining threaded rod 72.

The use of multiple scaffold elements 66 that may be assembled together allows the size of the printed scaffold 10 to be arbitrarily increased beyond the size capacity of a particular 3D printing machine. In some embodiments, seams 67 between the scaffold elements 66 may be spanned by the axially extending reinforcement components 19 during assembly for greater strength. The reinforcement components 19 may be attached to the scaffold elements 66 by an adhesive.

Figure 9:
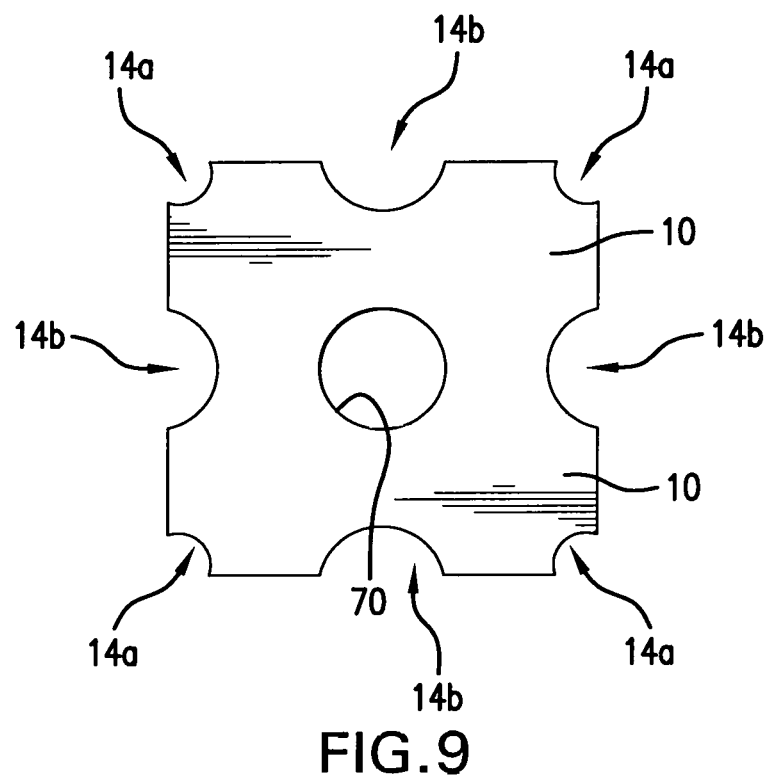
FIG. 9 is a cross-sectional view of the scaffold before assembly of the reinforcement components.

Referring to FIGS. 8 and 9, in this example, the scaffold 10 provides a substantially square cross-section having axially extending pockets 14a in each of the corners of the square around the central bore 70 for the receipt of reinforcement components 19a, the later being, for example, solid rods of a pultruded carbon fiber material. Faces of the square cross-section of the scaffold 10 may also have axially extending pockets 14b receiving tubular reinforcement components 19b being, for example, pultruded carbon fiber tubes.

Figure 10:
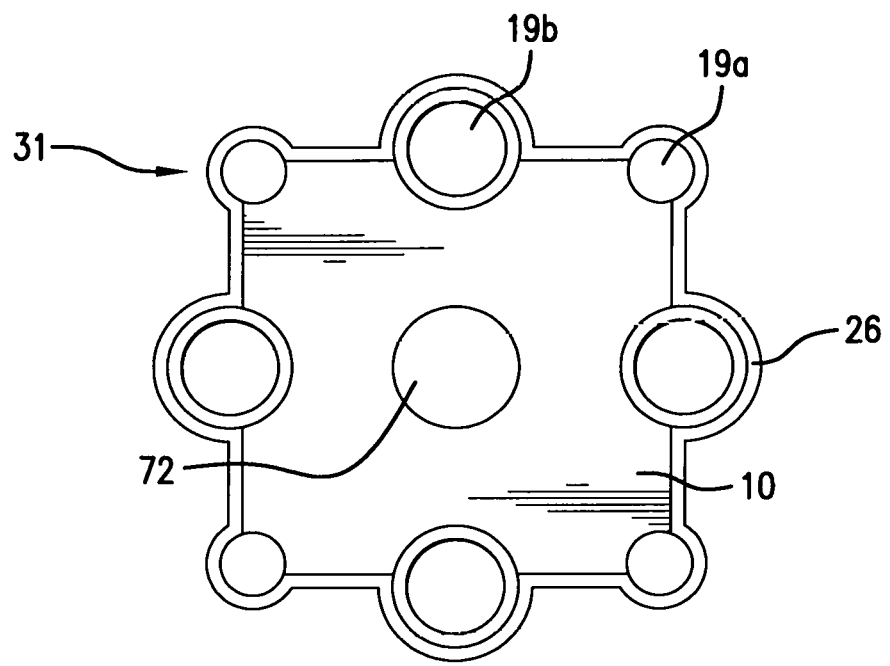
FIG. 10 is a cross-section similar to that of FIG. 9 showing installation of the reinforcement components on the scaffold and application of the secondary composite material.

Referring to FIG. 10, upon assembly of the reinforcement components 19a and 19b on the scaffold 10, a secondary composite 26 may be applied around the outside of the scaffold 10 in contact with the reinforcement components 19a and 19b and the scaffold 10 to integrate them into a completed hybrid composite element 31. In this case, the scaffold 10 is retained within the hybrid composite element 31. The secondary composite 26, for example a matt of woven fiber impregnated with a hardening polymer material, may provide for a continuous extent that spans the seams 67 between the scaffold elements 66 and between the reinforcement components 19.

Figure 11:
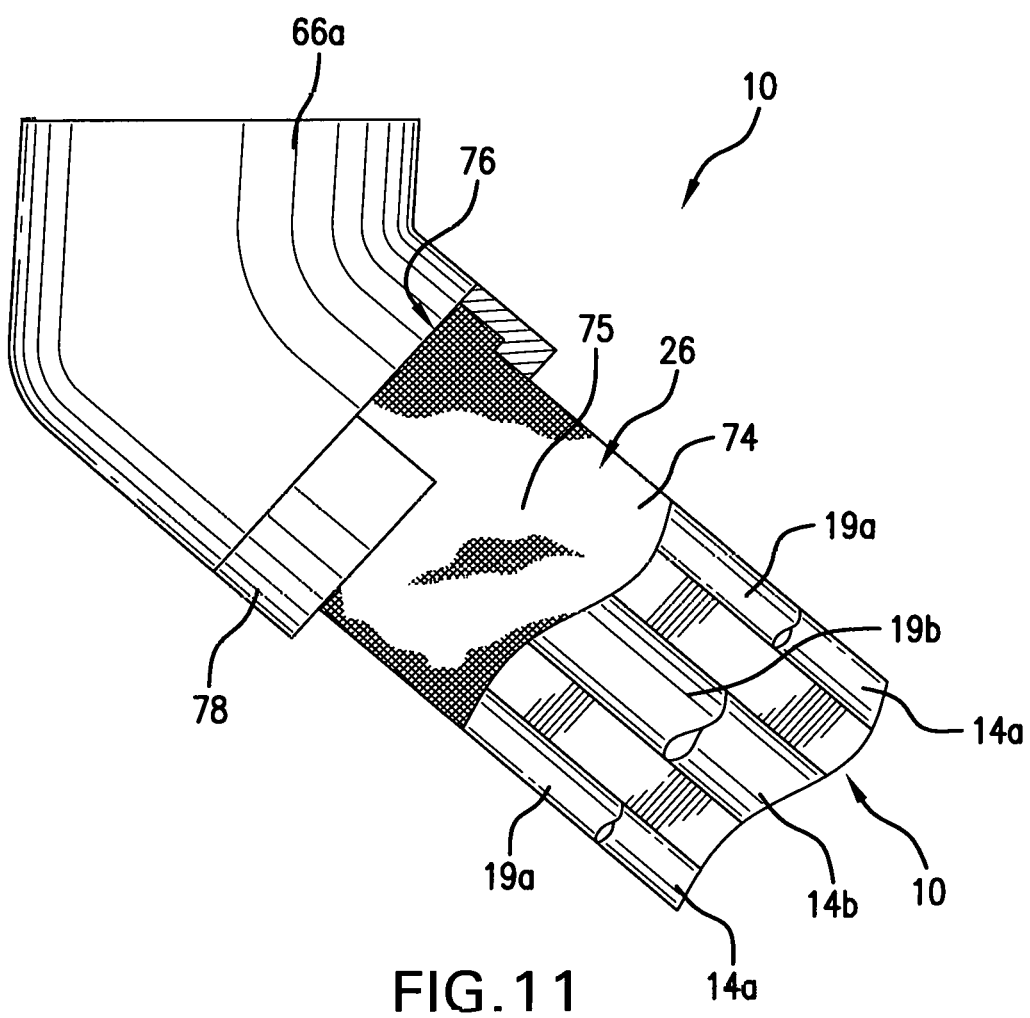
FIG. 11 is a top fragmentary view of the bumper scaffold of FIG. 7 showing application of a reinforcing fabric sleeve around the scaffold and reinforcing components as part of the secondary composite material and showing a retainer ring that may fit around ends of the fabric sleeve to corral frayed edges of the sleeve.

Referring now to FIGS. 10 and 11, the secondary composite 26 covering the assembled scaffold 10 and reinforcement components 19 of FIG. 10 may include a fabric sleeve 74, for example, of a woven or nonwoven carbon fiber mesh, that may be impregnated with a polymer matrix material 75 hardening around and within the fabric sleeve 74 to provide the reinforced secondary composite 26. The frayed ends 76 of the fabric sleeve may be finished by means of a 3-D printed retainer ring 78 conforming closely to the outer dimensions of the scaffold 10 near the frayed ends 76 with an allowance for the thickness of the fabric sleeve 74. The retainer ring 78 covers a frayed end 76 eliminating a need for an additional manufacturing step of trimming the fibers of this frayed end 76. The retainer rings 78 may be integrated with the composite material 26 by the same impregnating polymer matrix material 75 to provide a fully integrated assembly.

Figure 12:
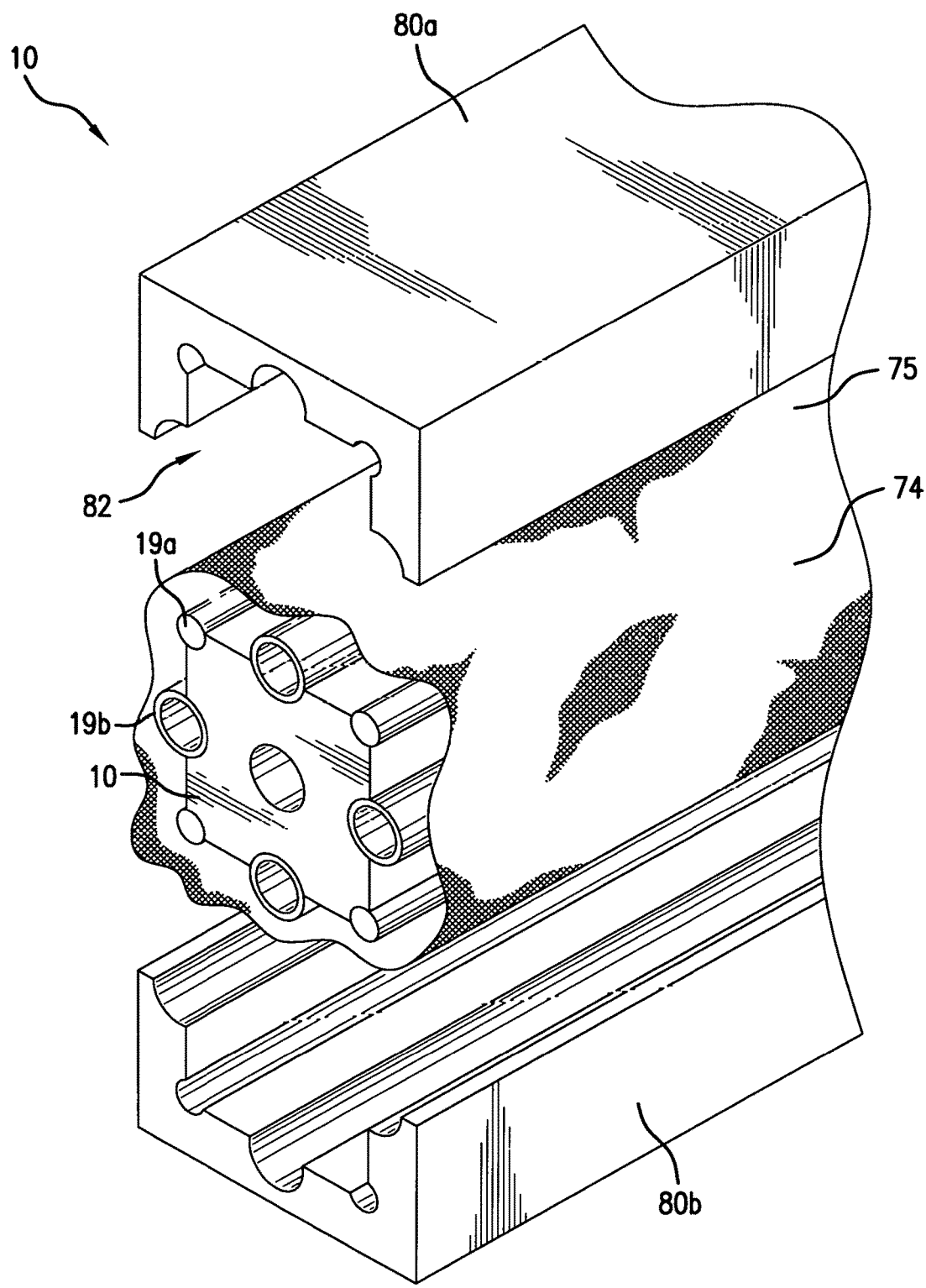
FIG. 12 is a perspective fragmentary view of a protective sheath that may alternatively or in addition cover the fabric layer as an additional protective element.

Referring now to FIG. 12, in an alternative embodiment, a 3-D printed sheath 80, for example, fabricated in two inter-fitting halves 80a and 80b may be 3-D printed to have an internal cavity 82 closely conforming to the scaffold 10 as assembled to the reinforcement components 19 with an allowance for the fabric sleeve 74. This sheath 80 may, but need not be, adhered to the secondary composite 26 and serves to protect finished composite and in particular the fabric sleeve 75 from impact damage, punctures, or cuts by sharp objects. 3-D printing allows the complex cavity 82 to be easily formed on a custom basis. The printed sheath 80 may be used with or without the retainer ring 78.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

The invention claimed is:

1. A hybrid composite material comprising:
    a first scaffold of first material including mechanical detent elements receiving a first composite material component to locate and retain the composite material component attached to the first scaffold including reinforcing fibers of a second material in a matrix of a third material; and
    a second scaffold including second reinforcing fibers of a fourth material and a second composite material component in a matrix of a fifth material adhered to the reinforcing fibers adhered to the first scaffold.

2. The hybrid composite materials of claim 1, wherein the first scaffold and second scaffold each comprise a plurality of additive manufactured elements.

3. The hybrid composite assembled scaffold of claim 2, wherein the plurality of additive manufactured elements comprise a plurality of additive manufactured scaffolds.

4. The hybrid composite assembled scaffold of claim 2, wherein the plurality of additive manufactured elements are adhered to a plurality of hybrid composite elements.

5. The hybrid composite assembled scaffold of claim 2, wherein the plurality of additive manufactured elements mechanically are secured to each other by a plurality of threaded rods.

6. The hybrid composite assembled scaffold of claim 2, wherein the plurality of additive manufactured elements define a plurality of micro-channels.

7. The hybrid composite assembled scaffold of claim 6, wherein the plurality of micro-channels are interconnected.

8. The hybrid composite assembled scaffold of claim 6, further comprising a fluid, wherein the plurality of micro-channels define internal fluid ducts and the fluid is conveyed within the internal fluid ducts.

9. The hybrid composite assembled scaffold of claim 8, wherein the fluid comprises a heat conducting fluid.

10. The hybrid composite assembled scaffold of claim 6, wherein the plurality of micro-channels define internal vacuum ducts and wherein the internal vacuum ducts diffuse a vacuum.

* * * * *